Oct. 4, 1966     L. C. LIVINGSTON ETAL     3,276,685

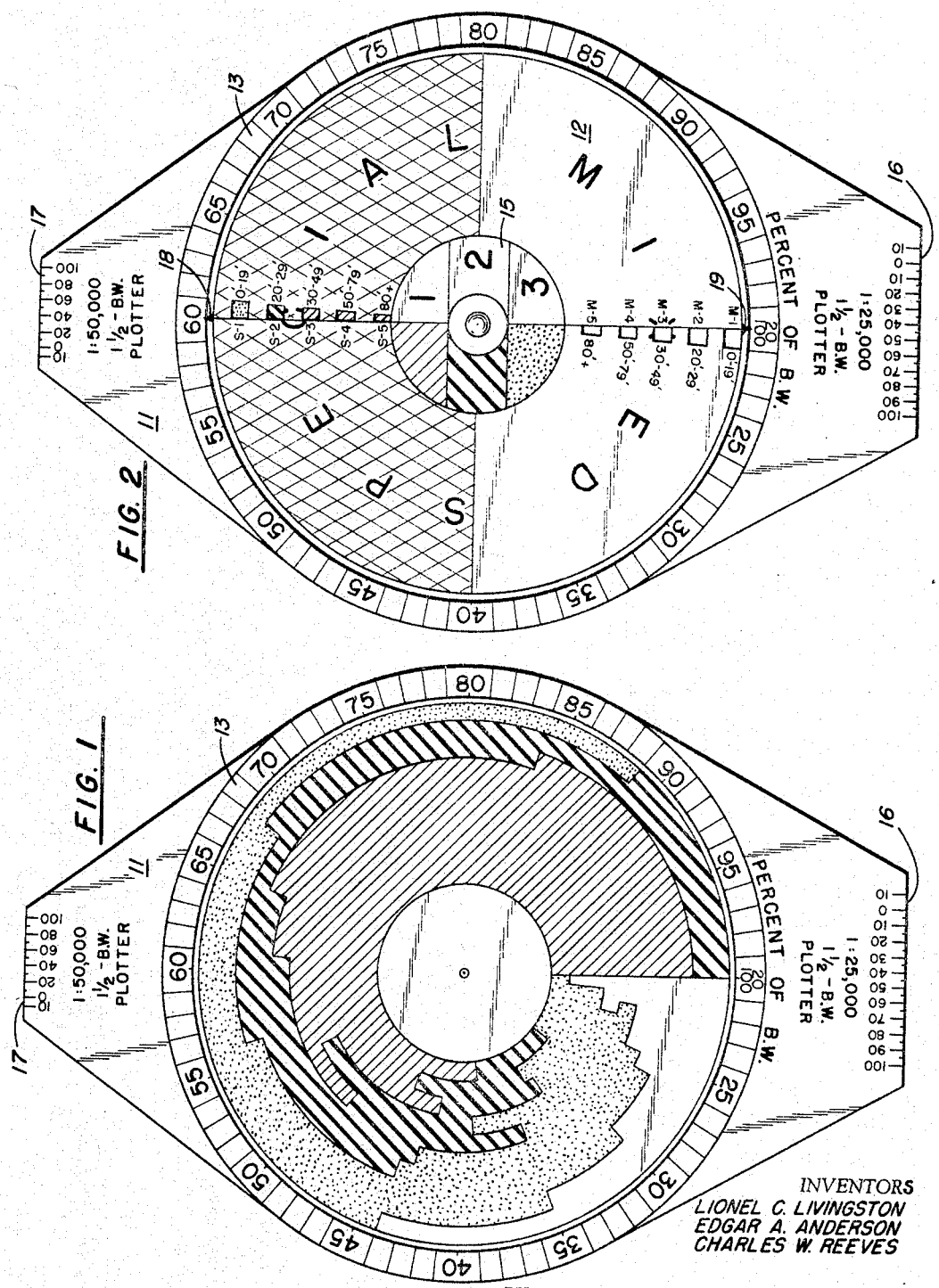

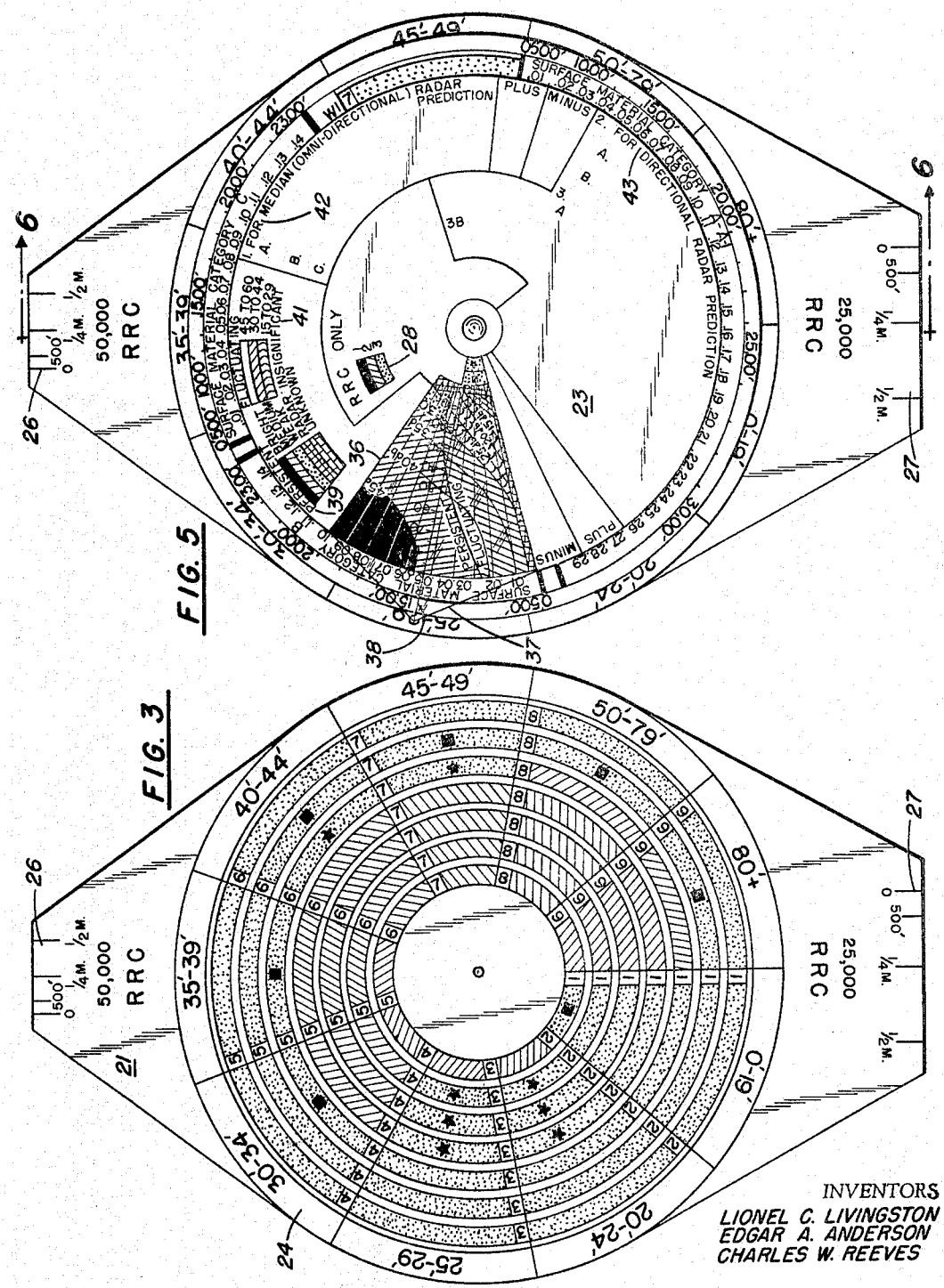

COMBINATION RADAR INTENSITY CALCULATOR

Filed March 31, 1959     3 Sheets-Sheet 3

INVENTORS
LIONEL C. LIVINGSTON
EDGAR A. ANDERSON
CHARLES W. REEVES

BY *R. S. Tompkins*

ATTORNEY

United States Patent Office 3,276,685
Patented Oct. 4, 1966

3,276,685
COMBINATION RADAR INTENSITY CALCULATOR
Lionel C. Livingston, 3432 13th St. SE.; Edgar A. Anderson, 4949 White Oak Drive; and Charles W. Reeves, 5208 Birchwood Drive, all of Washington, D.C.
Filed Mar. 31, 1959, Ser. No. 803,322
5 Claims. (Cl. 235—88)

The invention described herein may be manufactured and used by or for the Government of the United States of America for governmental purposes without the payment of any royalties thereon or therefor.

The present invention relates to a combination radar intensity calculator and more particularly to a radar intensity calculator which may be used to predict radar intensity by three separate methods without reference to a plurality of charts and tables.

It is the general practice to compute radar intensity by any one of three methods, namely, the Radar Intensity Diagram method (hereinafter referred to as RID), the Radar Return Code method (hereinafter referred to as RRC) and the Decibel Radar Prediction System. Heretofore there was no single calculator which could be used to speedily and accurately predict radar intensity, and, instead, it was necessary to refer to a plurality of charts and tables which, in addition to being inconvenient, were often inaccurate. For example, in determining radar intensity by the old RID method, it was necessary to first measure a designated coded area in terms of beam width and height and then enter a table of power factors, determine the power factor consistent with the beam width and height measurement and then refer to a second table in order to find the radar return for a particular power factor number. The power factors were given for every ten degrees of beam width and, hence, when the coded area measured 34 percent beam width, for example, it was necessary to interpolate to get the power factor. However, the table of return numbers was more critical than the power factor table and therefore an interpolated power factor often resulted in an incorrect return number. Similarly, the conventional RRC method required the steps of locating a coded number on a height-structure overlay and then entering a structure table where the code number was used to find the correct RRC return numbers. A second table of RRC code numbers had to be referred to to determine if the RRC return number had to be corrected because of peculiar structural detail. This method was slow and tedious since two tables and an overlay were necessary for its performance, and since the RRC code number table was broken down into at least 60 code squares, the code squares being further divided into three separate RRC returns. The old decibel system required the steps of selecting three variables from an area radar prediction analysis table, selecting a proper graph which contains the three variables and determining the correct return number by means of a triangle. Subsequently, it was necessary to correct the return number because of critical area factors by means of a second table. The number of tables and variables involved and the step of using a triangle made this method cumbersome and highly susceptible to error.

The instant invention avoids the difficulties in radar intensity determination as discussed above by combining all of the necessary data on an easily read calculator which may be used in the RID, RRC and decibel methods. In addition to eliminating the many charts, tables, and graphs, the calculator may be calibrated in a more critical manner whereby the errors introduced by interpolation and reference to the several data sheets employed by the old methods are obviated.

An object of the present invention, therefore, is to provide a single instrument which may be used to predict radar intensity.

More specifically, it is an object of this invention to provide a single instrument which may be used to predict radar intensity by RID, RRC or the decibel system.

Other objects and many of the attendant advantages of this invention will be readily appreciated as the same becomes better understood by reference to the following detailed description when considered in connection with the accompanying drawings wherein:

FIG. 1 is a view of the stationary member of the RID computor.

FIG. 2 is a view showing the assembled members of the RID computor.

FIG. 3 shows the stationary member of the RRC and decibel side of the calculator.

FIG. 5 shows the assembled RRC and decibel calculator.

Figure 4:
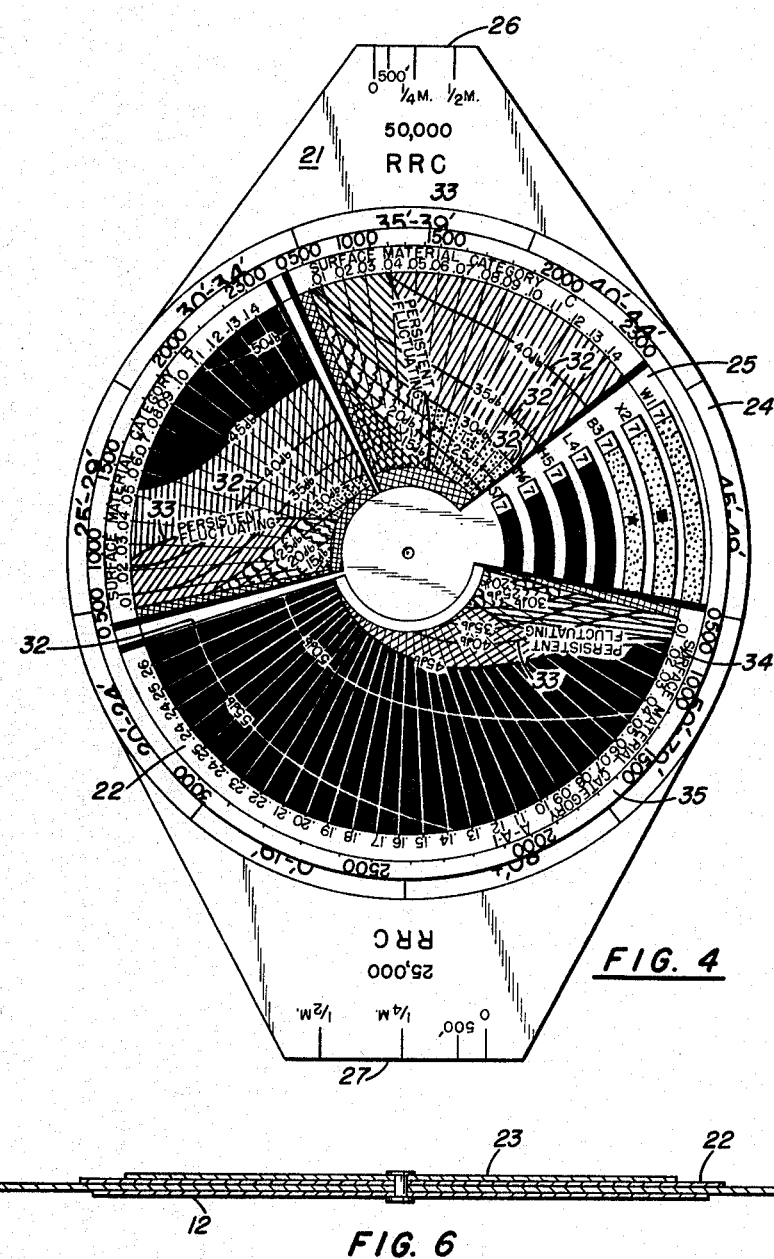
FIG. 4 shows the stationary member and the inner rotating scale of the RRC and decibel calculator.

Referring first to FIGS. 1 and 2 there is shown the RID side of the computor which is comprised of a stationary portion 11 and a movable dial 12. The stationary portion includes a circular scale 13 which is divided into 80 equal arcs, numbered from 20 to 99, representing percentages of beam width. Within the circular scale are three distinctive patterns which indicate the radar return intensities, there being an intensity key 15 on member 12 for translating the intensity patterns into radar return numbers. At the ends of stationary member 11 are calibrations 16 and 17 for measuring percentage of beam width on chart scales of 1:25,000 and 1:50,000. In the example shown, these scales are designed to represent a section of a 1½° beam width radar at 17½ nautical miles.

The dial 12 is divided into two half-circular sections marked "Mixed" and "Special" which designate the composite mixed and special material compositions of the coded area to be measured by percentage of beam width. Each of the half-circular sections contains five windows, each of which is marked to correspond to a height category on the coded area, and an arrow 18 or 19.

The RID computer is used as follows: A section for consideration is selected from a coded composite which is a mapping of predominate street patterns and building locations, compositions and heights. The longest dimension (consistent with the building frontal alignment along the predominant street patterns) is measured in terms of beam width by the calibration (either 16 or 17) which corresponds to the scale of the composite, and the height and composition (that is, whether it is mixed or special) of the section are noted. Member 19 is then rotated until the arrow on the appropriate half-circular section points to the measured beam width, and the distinctive pattern is viewed through the window corresponding to the height category of the measured section. Finally, the pattern is compared to the code key 15 to determine the radar return number. It will be seen that the radar return number is significant to the nearest degree of beam width, thus avoiding the interpolation and introduction of error involved in the old RID method as discussed above.

Assuming that the composite shows a structure having a special composition, a height of 18 feet and which is measured at 60 percent beamwidth, the dial 12 is rotated until arrow 18 points to 60 on scale 13. The distinctive pattern which appears in window S-1 is then compared to key 15 indicating a radar return number of 3.

Figure 6:
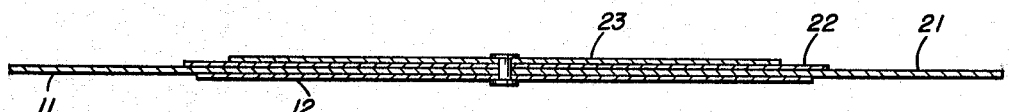
FIG. 6 is a side view of the calculator.

FIGS. 3, 4, 5, and 6 illustrate the RRC and decibel side of the computer which is composed of a stationary index member 21, an inner rotating member 22 and an outer rotating member 23. The RRC computer consists of a circle 24 divided into nine pie-shaped, equal sectors which represent the nine height categories of a composite map of the several areas to be considered. Within each sector are seven concentric bands of a distinctive pattern indicative of the radar return intensity. As a matter of convenience, the bands of each sector are given a common number ranging from one through nine which is cumulative to the height category calibrations located around the circumference of the pie-shaped sectors. The inner member 22 has a pie-shaped segment 25 having seven concentric windows which are complementary to the seven bands of distinctive patterns on member 21, and each window is given a code number representing a particular structure category. At either end of member 21 are calibrations 26 and 27, similar to calibrations 16 and 17, which are used to measure areas on a composite map. A radar intensity key 28 is located on member 23 for translating the distinctive patterns into radar return numbers.

The use of the RRC computer is as follows: An area on a composite map is selected and its height category and structure category noted. Member 22 is then rotated until the segment 25 overlies the sector representing the height category of the selected area, and the distinctive pattern which appears in the window representing the structure of the selected area is compared to key 28 to find the radar return number. It will be understood that a transparent portion 36 of member 23 will be aligned with and in registration with the segment 25 so that the distinctive pattern representing the structure of the selected area may be visually ascertained through the transparent portion 36.

Assuming that the composite indicates a building having a height of 47 feet and a structure category of B3, member 22 (FIG. 4) is rotated until segment 25 overlies the portion of member 21 marked 45–49 feet. The pattern appearing through the window marked B3 is compared to key 28 indicating a radar return number of 3.

It will be noted that in certain bands of patterns a square or star appears. If the square or star appears in the selected structure category window, the area under consideration must be measured on the composite map to determine if the radar return number should be raised or lowered in accordance with a second key 29 which is also located on member 23. For example, the pattern appearing in window B3 (FIG. 4) contains a star. Hence, the length and width of the building under consideration must be measured using either scale 26 or 27 to determine if the radar return number should be raised or lowered.

Reference is now made to that portion of the calculator comprising the decibel computer which includes members 22 and 23. Member 22, exclusive of the segment 25, is divided into three sectors representing four surface material categories labeled A, A–1, B and C, the categories A and A–1 being represented by the same sector. Each of the three sectors contains a decibel graph with lines 32 curved in five decibel increments and is patterned or shaded to differentiate the various intensities of radar return. Further, each sector is subdivided by a line 33 which indicates whether the radar return will be persistent or fluctuating. Arranged in each sector are radial lines representing area in square nautical miles, there being a scale 34 calibrated in increments of 0.01 square nautical mile adjacent the circumference of said sectors, and a second scale 35 calibrated in 100-foot lengths.

The outer member 23 has a wedge shaped aperture 36 adapted to be superimposed over a selected surface material category. A transparent window 37 is placed over the aperture, there being a height scale 38 in the middle of the window and extending radially outward of member 23. The remainder of member 23 contains intensity keys 39 and 41 and correction tables 42 and 43.

In using the decibel computer, reference is first made to an area radar prediction analysis table which lists the surface material category, height above terrain, and surface material area in square nautical mile for the structures in any area under consideration. The area prediction analysis table also indicates the structures per square nautical miles, percent of tree coverage and any other critical factors relating to the area under consideration. Assuming that the surface material category is B, the area .05 nautical mile, the height 50 feet, and the chord length 1400 feet member 23 is rotated so that the aperture 36 overlies surface material category B with the end of scale 38 pointing to either .05 on scale 34 or to 1400 on scale 35 depending on wheather an omnidirectional or directional radar return, respectively, is to be determined. The basic radar return intensity pattern, the decibel return and whether the return is either persistent or fluctuating is then indicated opposite the correct height on scale 38. For example, on FIG. 5, the intensity pattern beneath 50 on scale 38 is medium and persistent, and the radar return is 40 decibels.

When an omni-directional radar prediction is being made, correction table 42 must be referred to in order to determine if the decibel return number must be raised or lowered because of critical factors in the area under consideration, such as the number of structures per square nautical mile and percent of tree coverage. Similarly, if a directional radar prediction is being made, table 43 must be referred to in order to determine if the decibel return number must be raised or lowered because of critical area factors.

Obviously, many modifications and variations of the present invention are possible in the light of the above teachings. It is therefore to be understood that within the scope of the appended claims the invention may be practiced otherwise than as specifically described.

What is claimed is:

1. A Radar Intensity Diagram computer comprising first and second relatively movable members, means rotatably connecting said first and second members, a circular scale on said first member, said scale being calibrated in arcs indicating percent of beam width, distinctive patterns indicating radar intensity return arranged within said circular scale, at least one linear scale on said first member graduated in percentages of a given beam width whereby a dimension of an area on a composite map may be measured in percentage of beam width, said second member being circular and of such a size that it may be superimposed over said distinctive patterns and lie within said circular scale, a line dividing said second member into half-circular sections, each of said half-circular sections indicating a structure composition category, an indicating arrow extending across said second member through its center and perpendicular to said line, and windows in each half-circular section extending radially outward from the center of said second member and lying adjacent said arrow, each of said windows indicating a height category whereby a distinctive pattern indicative of the radar intensity return of a structure will appear in the window representing the height of the structure when the arrow on the half-circular section representing the composition of said structure is rotated to the arc indicating the measured dimension of said structure.

2. A Decibel Radar Return computor comprising first and second relatively rotatable discs, means for rotatably connecting said discs, sectors marked off on said first disc representing surface material categories, a surface material marking adjacent each sector, radial lines within each sector representing area in square nautical miles, an area scale adjacent the circumference of said sectors, distinctive patterns in each sector indicating radar return intensity, a line dividing each sector into segments indicating persistent and fluctuating radar return, curved lines in each sector indicating the decibel value of radar return, a transparent portion in said second disc bounded by the circumstance of said second disc and two radii, a radial height scale on said transparent portion whereby the intensity pattern of an omni-directional prediction, the persistence of fluctuating characteristic and the decibel return value for a given structure may be determined by rotating said second disc and said radial height scale thereon to the surface category of said structure, alining said radial height scale with the area measurement of said structure and reading the markings opposite the calibration on said height scale which represents the height of said structure.

3. A computer as claimed in claim 2 in which said first disc has a circular scale around said area scale for indicating chord lengths whereby the radar intensity pattern of a directional prediction, the persistence or fluctuating characteristic, and the decibel return value for a given structure may be determined by superimposing by rotation of said disc and of said radial height scale thereon said aperture over the surface material category of said structure, alining said radial height scale with a chord length measurement, which is concentric with said area scale, marking of said structure and reading the values opposite the height of said structure on said height scale.

4. A combined Radar Return Code and Decibel Radar Return calculator comprising a stationary member, a circle on said stationary member divided into equal, pie-shaped sectors representing height categories, a height category scale around the circumference of said scale, concentric bands of distinctive patterns within each sector indicative of radar return intensity, a first rotatable disc superimposed over said distinctive patterns, a segment on said first disc equal in size to one of said sectors, concentric window strips in said segment, each of said window strips being complementary to a band of distinctive pattern, structure category markings adjacent each window strip, the remainder of said first disc being composed of sections indicative of surface material categories, radial lines within each section indicative of structure area, curved lines in each section indicating decibel value of radar return, distinctive patterns within each section indicative of radar return intensity, a line within each section dividing the sections into persistent and fluctuating radar return segments, a circular chord length scale on said first disc arranged around said sections, a second rotatable disc superimposed over said surface material category sections, an aperture in said second disc having a transparent covering, a height scale inscribed on the covering and extending radially outwardly of said second disc, at least one key on said second disc for translating said distinctive patterns into radar return intensity, at least one correction table on said second disc for correcting the decibel return values and a single means rotatably connecting said discs and stationary member.

5. A combined Radar Intensity Diagram, Radar Return Code and Decibel Radar Return calculator comprising a single stationary member, a circular scale on one side of said member indicative of percent of beam width values, distinctive patterns within said circular scale indicative of radar return intensity, a rotatable disc superimposed over said patterns, a line dividing said disc into half-circular sections representing material composition categories and a line of windows extending across said disc, each of said windows representing height categories, a circle on the other side of said stationary member divided into pie-shaped sectors representing height categories, concentric bands of distinctive patterns within each sector indicative of radar return intensity, a first rotatable member superimposed over said bands of patterns, a segment of said first member containing concentric bands of windows complementary to said bands of patterns and representing structure categories, a plurality of surface material category sections on the remainder of said first member, distinctive patterns in each section representing radar return intensity, a decibel return graph in each section, radial lines in each section representing surface area, a line in each section dividing said sections into persistent and fluctuating radar return segments, a second rotatable member superimposed over said first member, an aperture in said second member having a transparent covering, a height scale inscribed on said covering and a single means rotatably connecting said disc and first and second members with said stationary member.

References Cited by the Examiner

UNITED STATES PATENTS

| | | | |
|---|---|---|---|
| 1,902,672 | 3/1933 | Sperber | 35—74 |
| 1,924,754 | 1/1934 | Heyssler | 235—88 |
| 1,989,353 | 1/1935 | Davis | 35—74 |
| 2,586,058 | 2/1952 | Knopke | 235—88 |
| 2,834,123 | 5/1958 | Knight | 235—88 |

RICHARD B. WILKINSON, *Primary Examiner.*

F. M. STRADER, C. L. JUSTUS, *Examiners.*

R. A. VAN KIRK, M. R. WILBUR, *Assistant Examiners.*